United States Patent [19]

Sieloff

[11] Patent Number: 4,956,409

[45] Date of Patent: Sep. 11, 1990

[54] BINDER CHEMISTRY

[75] Inventor: Ronald F. Sieloff, Pataskala, Ohio

[73] Assignee: Owens-Corning Fiberglas Corporation, Toledo, Ohio

[21] Appl. No.: 225,566

[22] Filed: Jul. 26, 1988

Related U.S. Application Data

[63] Continuation of Ser. No. 8,067, Jan. 13, 1987, abandoned, which is a continuation of Ser. No. 770,005, Aug. 27, 1985, abandoned, which is a continuation of Ser. No. 616,343, Jun. 1, 1984, abandoned.

[51] Int. Cl.$^5$ .................................................. C08J 5/21
[52] U.S. Cl. ..................................... 524/211; 524/215; 524/261; 524/262; 524/157; 525/480; 525/504
[58] Field of Search ............... 524/211, 415, 261, 262, 524/157; 525/480, 504

[56] References Cited

U.S. PATENT DOCUMENTS

| | | |
|---|---|---|
| 3,331,799 | 7/1967 | Stalego . |
| 3,380,877 | 4/1968 | Smucker et al. . |
| 3,616,181 | 10/1971 | Stalego . |
| 3,702,798 | 11/1972 | Shannon . |
| 3,932,686 | 1/1976 | Foley et al. . |
| 4,052,359 | 10/1977 | Higginbottom ..................... 524/157 |
| 4,576,972 | 3/1986 | Lunt et al. .......................... 525/504 |

Primary Examiner—Joseph L. Schofer
Assistant Examiner—Peter D. Mulcahy
Attorney, Agent, or Firm—Patrick P. Pacella; Ted C. Gillespie; Robert F. Rywalski

[57] ABSTRACT

A glass wool binder is made to include a surfactant decomposable upon heating so as to produce a hydrophobic surface on the wool after curing of the binder.

6 Claims, No Drawings

BINDER CHEMISTRY

This is a continuation of application Ser. No. 008,067, filed on Jan. 13, 1987, which is a continuation of application Ser. No. 770,005, filed on Aug. 27, 1985, which was a continuation of application Ser. No. 616,343, filed on June 1, 1984, all of which are now abandoned.

TECHNICAL FIELD

This invention pertains to glass fiber binders. More specifically, this invention pertains to improved binder compositions for use in manufacturing articles containing glass fibers.

BACKGROUND OF THE INVENTION

The use of aqueous dispersions comprising phenolic resoles as binders in the production of wool and board products from glass and other vitreous fibers is common practice. It has been suggested that phenolic resoles can be modified to improve resistance to heat, including flame, by reaction with dicyandiamide, melamine, urea or thiourea. It has been further suggested that urea can be mixed, but not appreciably reacted, with the phenolic resoles and that the resulting mixtures are useful in the production of wools and boards from glass and other vitreous fibers. The unreacted or "raw" urea does not cause the resole to cure or set prematurely, does not lower the application efficiency, and actually improves the dilutability. Often it is desirable to attach a smooth wear and/or appearance layer on the surface of the product. With existing systems, the surface of the wool is porous and the water based adhesive used to attach the appearance or wear layer wickes in. Because of this, an excessive amount of adhesive must be used to obtain a good bond.

In contrast, the method of the present invention provides a surface on the wool which will not absorb a water-based adhesive and, thus, much less adhesive is needed to properly adhere an appearance layer to the surface of the pack.

STATEMENT OF THE INVENTION

According to the present invention, there is provided an improved binder for a moldable article comprising a wool-like mass of intermeshed glass fibers and a binder. The improved binder comprises a phenol-formaldehyde resole condensate, urea, a silane, and a heat decomposable surfactant. The surfactant gives good wetting on application of the binder to the wool pack but when the moldable mixture is cured, the surfactant in the surface layer decomposes causing the surface of the molded article to be hydrophobic in nature.

DESCRIPTION OF THE INVENTION

The method of this invention can employ any type and composition of glass fiber conventionally good for forming insulation products and glass bats subsequently moldable to form head-liners, wall panels, space dividers, and the like. The fibers can have binders on their surfaces.

For purposes of illustration, the invention will be described in terms of bats composed entirely of glass fibers although mixtures of glass fibers with other materials such as polyester fibers, ceramic fibers, and the like can be employed.

An improved resole composition is provided according to the invention. Such composition comprises an aqueous dispersion of urea, a resole, and an amino alkyl silane or silane hydrolysis product and a surfactant. In general, the silane or silane hydrolysis product should constitute, in weight percent, from about 0.01 percent to about 3 percent of the total solids in the composition, urea should constitute from about 3 percent to about 60 percent, the phenolic resole should constitute from about 40 percent to about 97 percent, and the surfactant about 0.25 to about 10 percent. The preferred ranges are silane about 0.02 percent to about 2 percent, urea about 5 percent to about 45 percent, phenolic resole about 50 percent to about 90 percent, and the surfactant about 1.0 percent to about 8 percent.

The specific identity of the phenolic resole in a composition according to the invention is not critical. Accordingly, the identity of the phenol and the aldehyde that are reacted to produce the resole is of only incidental importance. Accordingly, the resole can be the partial condensation product of any suitable pnenol with any suitable aldehyde (for a discussion of resoles, see Martin, The Chemistry of phenolic Resin, John Wiley & Sons, Inc., New York. 1956, particularly pages 87 through 98, and cited references). As a practical matter, however, a resole curable to an infusible resite is usually preferred for use in connection with vitreous fibers so that at least a significant amount of a trifunctional phenol, usually hydroxy benzene for economic reasons, is preferably employed. Formaldehyde, for economic reasons and because of the greater simplicity of its chemical reactions with a phenol, is the preferred aldehyde. Most desirably, the resole is produced by reaction of formaldehyde with pnenol (hydroxy benzene) and usually in proportions from 1 mol to 4.5 mols, preferably from about 1.75 mols to about 4.2 mols of formaldehyde per mol of phenol.

Metallic cations, particularly highly alkaline metallic cations, if present in a phenolic resole applied to glass or other vitreous fibers are detrimental, apparently causing deterioration both of the fibers themselves and of the resite binder. Phenolic resoles are usually prepared in the presence of highly alkaline condensing agents so that the metallic cations thereof are preferably either removed from the resole prior to use, for example by cation exchange treatment of the resole, or converted to a form in which they are harmless. As an example of the latter technique, the condensation to produce the resole can be carried out in the presence of barium hydroxide as a condensing agent, and the barium hydroxide can be neutralized, after completion of the partial condensation to form the resole, with sulfuric acid or the like to produce barium sulfate. The barium sulfate can be left in the resole, since it is harmless, provided that it has a sufficiently small particle size so as not to impair handling of the resole, or it can be removed by filtration.

An improved resole composition, according to the invention, comprises an amino alkyl silane or silane hydrolysis product. In general, it has been found that any commercially available amino alkyl silane is highly advantageous in such a binder composition. Such silanes have the general formula

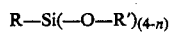

$$R-Si(-O-R')_{(4-n)}$$

wherein R is an amino alkyl radical chemically bonded to the silicon atom, R' is an alkyl radical having from 1 to 4 carbon atoms, and n is an integer from 1 to 3, inclusive. optimus results have been achieved using a silane having the general formula $NH_2C_2H_4NHC_3H_6Si(—OCH_3)_3$ Excellent results have also been achieved using gamma-amino-propyltriethoxy silane. A preferred class of such silanes is one wherein R in the foregoing general formula has the formula $H_2N—R''$ where $R=$ is an alkylene radical having from 2 to 6 carbon atoms. Another such preferred class is one wherein R has the formula $H_2N—R''—NH—R'''$ wherein $R''$ and $R'''$ are both alkylene radicals having from 2 to 6 carbon atoms.

Selection of the proper surfactant is very important in this binder application. The surfactant must have the proper wetting properties so that the binder will penetrate the wool pack. Some of the binder must penetrate to the center of the wool pack. However, having a layer near the surface that is binder-rich given a smoother finish to the cured part. After application, the wool and binder can be dried in a RF oven and stored until ready to mold into the finished product. The wool is molded into the finished product at a temperature of 400°0163 –500° F. with a cure time of about 90 seconds. This cure time varies from about 15 seconds to about 3 minutes. During this cure cycle the surfactant in the surface layer is decomposed by the cure heat. This gives a molded product with a hydrophobic surface. Water-based adhesives can therefore be applied to the surface of the molded wool without the adhesive soaking or wicking into the interior of the molded article. This allows the use of much less adhesive when used to apply a finish or appearance coating to the molded article. Two surfactants which have the properties needed for this use are Aerosol OT-75 and polystep B-11. Aerosol OT-75 is a product of American Cyanidmide, Wayne, N.J. and is a dioctyl ester of sodium sulfosuccinic acid. Polystep B-11 is a product of stepon Chemical Company, Northfield, Ill. and is ammonium lauryl ether sulfate. Both of these surfactants will be decomposed in the surface layer by the curing cycle used in this invention thereby giving a hydrophobic surface.

Various acid and base compounds can be used to control the pH of the binder solution to give it the desired stability. A side range of binder to glass fiber weight ratios can be used to make useable products. There can vary from about 5 weight percent binder to more than 60 weight percent binder. The more useful range is from about 10 weight percent to about 45 weight percent binder in the molded product. The density of the molded product can also vary over a large range. Useful products can be as light as 1 pound per cubic foot and as heavy as 45—50 pounds per cubic foot.

The invention will be understood more fully by reference to the following examples which are presented solely for the purpose of further illustrating and disclosing and are in no way to be constructed as limiting.

EXAMPLE I

Preparation of Resole Resin

A catalyst slurry is made with 1000 grams of water and 160 grams of calcium hydroxide. 6,470 grams of 52 percent formaldehyde and 2,480 grams of phenol are placed in the reaction vessel. This mixture is agitated for 5 minutes and then the temperature is raised to 115° F. While the temperature is held at 115° F., the catalyst slurry is added over a 2 hour period. The temperature is raised to 125° F. for 1 hour. The temperature is then raised to 150° F. and held at this temperature until the percent free phenol decreases below 12.5 percent. This should take 2-3 hours. Then the resin is cooled to 7° F. and stored until needed.

EXAMPLE II

Preparation of Binder Mix

In a reaction vessel are placed 363 grams of urea, 2.5 grams of silane and 5 grams of sodium hexamethyl phosphate. This is mixed for 5 minutes and 606 grams of the resole from Example I are added. This is stirred for 2 hours and then the pH is adjusted to 7.5 with a combination of dimmonium phosphate and ammonium sulfate, or with phosphoric acid. This is mixed for 10 minutes and the pH adjusted to 8.0 to 8.5 with ammonia and 15 grams of Aerosol TO-75 is then mixed in. The binder is now ready for use.

EXAMPLE III

The same as Example II except the Aerosol OT-75 is replaced with 15 grams of polystep B-11.

EXAMPLE IV

The same as Example II except the Aerosol OT-75 is replaced with 15 grams of tergitol NP-10, a nonylphenyl polyethylene glycol ether made by Union Carbide Corporation, New York, N.Y.

EXAMPLE V

The binder from Example II is applied as a foam to a glass wool pack which contains only enough binder, about 2 weight percent, to hold the wool pack together. Enough of the binder made in Example II is applied to give a 23-33 dry weight percent binder in the wool pack. The wool pack is dried in a RF oven and molded at about 400–500° F. for about 90 seconds. At this time a smooth, resin rich, hydrophobic surface is obtained.

|  | In Weight Percent Of Solids | | | |
| --- | --- | --- | --- | --- |
|  | Preferred Range | Example II | Example III | Example IV |
| Resole Resin | 50–90 | 60.6 | 60.6 | 60.6 |
| Urea | 5–45 | 36.3 | 36.3 | 36.3 |
| Silane | 0.02–2.0 | 0.25 | 0.25 | 0.25 |
| Sodiumhexamethaphosphate | 0.1–2.0 | 0.5 | 0.5 | 0.5 |
| Diammoniumphosphate Ammonium Sulfate Ammonia | 1.5–5 | 2.35 | 2.35 | 2.35 |
|  | As Needed | As Needed | As Needed | As Needed |
| Surfactant | 1.0–8 | — | — | — |
| Aerosol OT-75 | — | 1.5 | — | — |
| Polystep B-11 | — | — | 1.5 | — |
| Tergitol NP-10 | — | — | — | 1.5 |
| Cured Product Water Wetable |  | No | No | Yes |

It will be evident from the foregoing that various modifications can be made to the method of this invention. Such, however, are considered within the scope of the invention.

I claim:

1. A method of applying an aqueous foamed binder system to a glass fiber pack which already contains enough binder to hold the glass fiber pack together which comprises including in the aqueous foamed binder system a heat-decomposable surfactant, applying the aqueous foamed binder to the pack and heating the pack and binder system to decompose the surfactant and produce a hydrophobic surface layer on the pack.

2. A method of forming a fibrous glass product comprising combining in an aqueous medium a phenolic resole, urea, a silane or hydrolysis product thereof and a decomposable surfactant so as to form a phenolic resole binder, foaming said phenolic resole binder and applying said foamed resole binder to a wool pack which already contains a binder; molding and curing said wool pack to a final product and wherein said surfactant decomposes during molding and curing to leave a hydrophobic surface on said product.

3. The method of claim 2 wherein said wool pack contains about 2 percent by weight of a binder prior to said application.

4. The method of claim 2 wherein said surfactant is a dioctyl ester of sodium sulfosuccinic acid.

5. The method of claim 1 wherein said pack contains about 2 percent by weight of a binder prior to said application.

6. The method of claim 1 wherein said surfactant is a dioctyl ester of sodium sulfosuccinic acid.

* * * * *